United States Patent
Jang

(10) Patent No.: US 11,227,485 B2
(45) Date of Patent: Jan. 18, 2022

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventor: Duhe Jang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/801,929

(22) Filed: Feb. 26, 2020

(65) Prior Publication Data

US 2020/0273324 A1    Aug. 27, 2020

(30) Foreign Application Priority Data

Feb. 27, 2019  (KR) .................. 10-2019-0023255

(51) Int. Cl.
  *G08B 21/00*  (2006.01)
  *G08C 23/04*  (2006.01)
  (Continued)

(52) U.S. Cl.
  CPC ............. *G08C 23/04* (2013.01); *G08C 19/12* (2013.01); *G08C 19/28* (2013.01); *H04B 1/034* (2013.01);
  (Continued)

(58) Field of Classification Search
  CPC ........ G08C 23/04; G08C 19/28; G08C 19/12; G08C 2201/20; H04N 21/42204;
  (Continued)

(56) References Cited

U.S. PATENT DOCUMENTS 5,469,152 A    11/1995  Yamamoto et al.
5,815,297 A *  9/1998  Ciciora ................ H04B 10/114
                                                340/12.53
(Continued)

FOREIGN PATENT DOCUMENTS

JP    3104192 B2    10/2000
JP    2005168662 A   6/2005
(Continued)

OTHER PUBLICATIONS

International Search Report (PCT/ISA/210) dated Jun. 17, 2020 issued by the International Searching Authority in International Application No. PCT/KR2020/002704.
(Continued)

*Primary Examiner* — Mark S Rushing
(74) *Attorney, Agent, or Firm* — Sughrue Mion, PLLC

(57) ABSTRACT

An electronic device according to the disclosure includes an infrared signal receiver, an infrared signal transmitter, a memory that stores computer instruction code, which, when executed by a processor, causes the processor to: receive a first infrared signal output from a remote control device according to a user input for controlling an external device connected with the electronic device through the infrared signal receiver, identify a second infrared signal corresponding to one of control commands for controlling the operation of the external device based on control information included in the received first infrared signal, identify the output timing of the second infrared signal based on the type of the first infrared signal, and control the infrared signal transmitter to output the determined second infrared signal based on the identified output timing.

19 Claims, 12 Drawing Sheets

(51) Int. Cl.
*G08C 19/28* (2006.01)
*G08C 19/12* (2006.01)
*H04B 1/034* (2006.01)
*H04N 21/422* (2011.01)

(52) U.S. Cl.
CPC ... *H04N 21/42204* (2013.01); *G08C 2201/20* (2013.01); *H04N 21/42208* (2013.01); *H04N 21/42221* (2013.01); *H04N 21/42226* (2013.01)

(58) Field of Classification Search
CPC ....... H04N 21/42208; H04N 21/42221; H04N 21/42226; H04N 21/411; H04B 1/034
USPC ...................................................... 340/12.54
See application file for complete search history.

(56) References Cited

U.S. PATENT DOCUMENTS

| | | | |
|---|---|---|---|
| 8,836,485 | B2 | 9/2014 | Murakami et al. |
| 9,513,612 | B2 | 12/2016 | Park |
| 2007/0063862 | A1 | 3/2007 | Lippincott |
| 2009/0066855 | A1 | 3/2009 | Kumano |
| 2013/0330084 | A1* | 12/2013 | Du ................. G08C 23/04 398/106 |
| 2016/0021327 | A1* | 1/2016 | Wang ............. H04N 21/42204 348/734 |
| 2017/0366778 | A1 | 12/2017 | Kim et al. |

FOREIGN PATENT DOCUMENTS

| | | |
|---|---|---|
| JP | 2005175778 A | 6/2005 |
| JP | 5175782 B2 | 4/2013 |
| KR | 1020090075491 A | 7/2009 |
| KR | 10-2012-0099857 A | 9/2012 |
| KR | 1020130079813 A | 7/2013 |
| KR | 10-1395162 B1 | 5/2014 |
| WO | 2016036227 A1 | 3/2016 |

OTHER PUBLICATIONS

Written Opinion (PCT/ISA/237) dated Jun. 17, 2020 issued by the International Searching Authority in International Application No. PCT/KR2020/002704.

Communication dated Oct. 20, 2021 by the European Patent Office in counterpart European Patent Application No. 20763695.2.

* cited by examiner

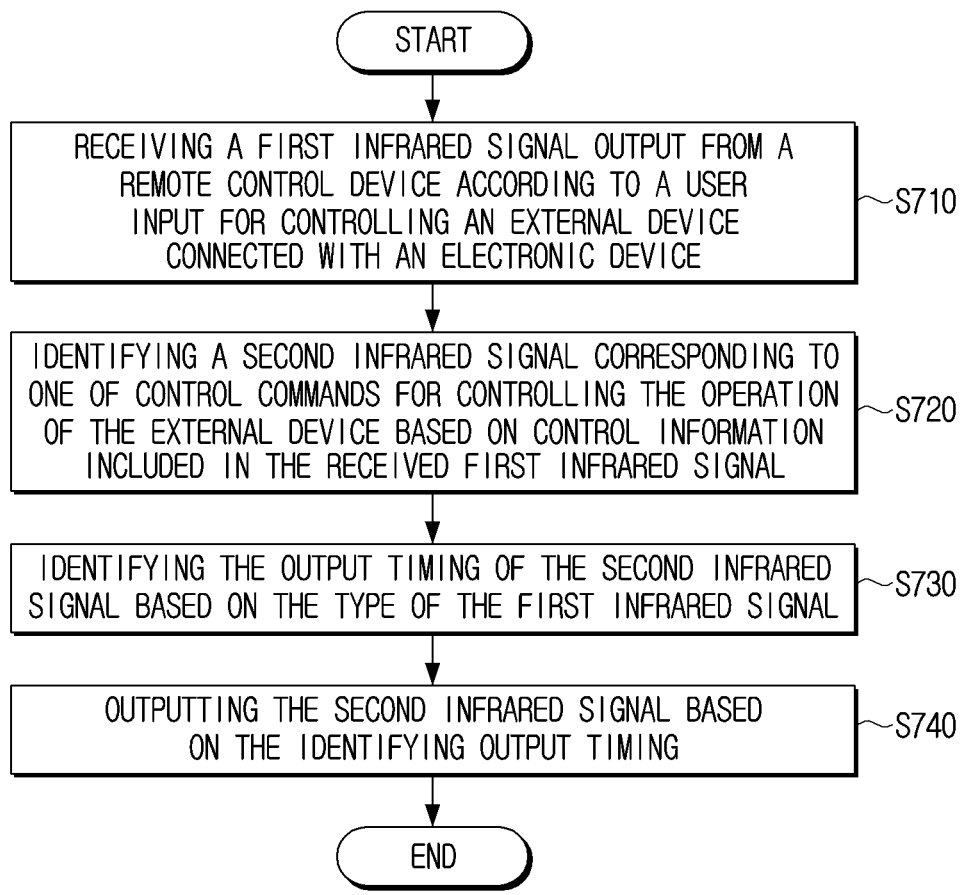

ELECTRONIC DEVICE AND CONTROLLING METHOD OF ELECTRONIC DEVICE

CROSS-REFERENCE TO RELATED APPLICATION(S)

This application is based on and claims priority under 35 U.S.C. § 119(a) of a Korean patent application number 10-2019-0023255, filed on Feb. 27, 2019 in the Korean Intellectual Property Office, the disclosure of which is incorporated by reference herein in its entirety.

BACKGROUND

1. Field

The disclosure relates to an electronic device and a controlling method of the electronic device, and more particularly, to an electronic device which is capable of preventing interference between an infrared signal received from a remote control device and an infrared signal output from the electronic device, and a controlling method thereof.

2. Description of Related Art

Recently, as the number of electronic devices placed in a home of a user increases, integrated remote control systems for effectively controlling a plurality of electronic devices through one remote control have been developed. Among them, an integrated remote control system using an infrared signal, in particular, can be implemented by a method as discussed below.

First, a remote control device (e.g., a remote control) can output an infrared signal for controlling an external device (e.g., a set top box) according to a user input. An electronic device (e.g., a TV) can receive the infrared signal output from the remote control device, and output an infrared signal for controlling an external device based on the received infrared signal. Then, the external device can receive the infrared signal output from the electronic device, and control the operation of the external device based on the received infrared signal.

However, in this case, an infrared signal is not only output from a remote control device but also from an electronic device, and accordingly, interference may occur between the two infrared signals. Also, in case interference occurs between two infrared signals, misrecognition of signals and breakage of a control operation may occur accordingly.

In particular, according to an operation of a user of pushing one of a plurality of control buttons included in a remote control device for a time period longer than or equal to a predetermined time period, if the remote control device repetitively outputs an infrared signal corresponding to the button, there is a high possibility that interference may occur between the infrared signal repetitively output from the remote control device and an infrared signal repetitively output from an electronic device in accordance thereto.

Accordingly, in an integrated remote control system using an infrared signal, a technology that can prevent interference between an infrared signal output from a remote control device and an infrared signal output from an electronic device is needed.

SUMMARY

The disclosure was devised according to the aforementioned need, and the purpose of the disclosure is in preventing interference between an infrared signal received from a remote control device and an infrared signal output from an electronic device.

According to an embodiment of the disclosure for achieving the aforementioned purpose, an electronic device may include an infrared signal receiver, an infrared signal transmitter, a memory that stores computer instruction code, and a processor that executes the computer instruction code.

The processor may receive a first infrared signal output from a remote control device according to a user input for controlling an external device connected with the electronic device through the infrared signal receiver, may identify a second infrared signal corresponding to one of control commands for controlling the operation of the external device based on control information included in the received first infrared signal, may identify the output timing of the second infrared signal based on the type of the first infrared signal, and may control the infrared signal transmitter to output the identified second infrared signal based on the identified output timing.

The processor may identify the type of the first infrared signal based on at least one of the length, the cycle, or the pattern of the first infrared signal.

The processor may, based on the received first infrared signal being an infrared signal of a first type output according to a user input of pushing one of a plurality of control buttons included in the remote control device for a time period shorter than a predetermined time period, identify the output timing of the second infrared signal as a first output timing corresponding to the first type. Meanwhile, the processor may, based on the received first infrared signal being an infrared signal of a second type output according to a user input of pushing one of a plurality of control buttons included in the remote control device for a time period longer than or equal to the predetermined time period, identify the output timing of the second infrared signal as a second output timing corresponding to the second type and different from the first output timing.

The processor may receive a plurality of first infrared signals repetitively output according to a user input of pushing one of a plurality of control buttons included in the remote control device for a time period longer than or equal to the predetermined time period from the remote control device through the infrared signal receiver. Also, the processor may, based on receiving each of the plurality of first infrared signals, control the infrared signal transmitter to repetitively output the identified second infrared signal.

The processor may identify the output timing of the second infrared signal such that each of the output timings of the plurality of second infrared signals repetitively output does not overlap with each of the receiving timings of the plurality of received first infrared signals.

The processor may identify the output timing of the second infrared signal such that each of the output sections of the plurality of second infrared signals has a time interval in a predetermined range with each of the receiving sections of the plurality of first infrared signals.

The processor may, based on receiving the plurality of first infrared signals by a predetermined cycle through the infrared signal receiver, may identify the output timing of the second infrared signal such that the plurality of second infrared signals are output through the infrared signal transmitter by the same cycle as the predetermined cycle by which the plurality of first infrared signals are received.

Meanwhile, the time interval in a predetermined range may be from 15 milliseconds (ms) to 37 milliseconds.

Meanwhile, the electronic device may further include a display, and the processor may blast the second infrared signal to the front surface of the electronic device through a waveguide included in the display.

Meanwhile, according to an embodiment of the disclosure, a controlling method of an electronic device may include the steps of receiving a first infrared signal output from a remote control device according to a user input for controlling an external device connected with the electronic device, identifying a second infrared signal corresponding to one of control commands for controlling the operation of the external device based on control information included in the received first infrared signal, identifying the output timing of the second infrared signal based on the type of the first infrared signal, and outputting the identified second infrared signal based on the identified output timing.

The step of identifying the output timing of the second infrared signal may further include the step of identifying the type of the first infrared signal based on at least one of the length, the cycle, or the pattern of the first infrared signal.

The step of identifying the output timing of the second infrared signal may further include the steps of, based on the received first infrared signal being an infrared signal of a first type output according to a user input of pushing one of a plurality of control buttons included in the remote control device for a time period shorter than a predetermined time period, identifying the output timing of the second infrared signal as a first output timing corresponding to the first type, and based on the received first infrared signal being an infrared signal of a second type output according to a user input of pushing one of a plurality of control buttons included in the remote control device for a time period longer than or equal to the predetermined time period, identifying the output timing of the second infrared signal as a second output timing corresponding to the second type and different from the first output timing.

The step of receiving a first infrared signal may further include the step of receiving a plurality of first infrared signals repetitively output according to a user input of pushing one of a plurality of control buttons included in the remote control device for a time period longer than or equal to the predetermined time period from the remote control device. Meanwhile, the step of outputting the second infrared signal may further include the step of, based on receiving each of the plurality of first infrared signals, repetitively outputting the identified second infrared signal.

In the step of identifying the output timing of the second infrared signal, the output timing of the second infrared signal may be identified such that each of the output timings of the plurality of second infrared signals repetitively output does not overlap with each of the receiving timings of the plurality of received first infrared signals.

In the step of identifying the output timing of the second infrared signal, the output timing of the second infrared signal may be identified such that each of the output sections of the plurality of second infrared signals has a time interval in a predetermined range with each of the receiving sections of the plurality of first infrared signals.

In the step of identifying the output timing of the second infrared signal, if the plurality of first infrared signals are received by a predetermined cycle, the output timing of the second infrared signal may be identified such that the plurality of second infrared signals are output by the same cycle as the predetermined cycle by which the plurality of first infrared signals are received.

Meanwhile, the time interval in a predetermined range may be from 15 milliseconds (ms) to 37 milliseconds.

Meanwhile, in the step of outputting the second infrared signal, the second infrared signal may be blasted to the front surface of the electronic device through a waveguide included in the display of the electronic device.

According to an embodiment of the disclosure, in a non-transitory computer readable recording medium including a program executing a method of controlling an electronic device, the method of controlling an electronic device may include the steps of, based on receiving a first infrared signal output from a remote control device according to a user input for controlling an external device connected with the electronic device, identifying a second infrared signal corresponding to one of control commands for controlling the operation of the external device based on control information included in the received first infrared signal, identifying the output timing of the second infrared signal based on the type of the first infrared signal, and outputting the second infrared signal based on the identified output timing.

BRIEF DESCRIPTION OF THE DRAWINGS

FIG. 7 is a flow chart illustrating a controlling method of an electronic device according to an embodiment of the disclosure.

DETAILED DESCRIPTION

Figure 1:
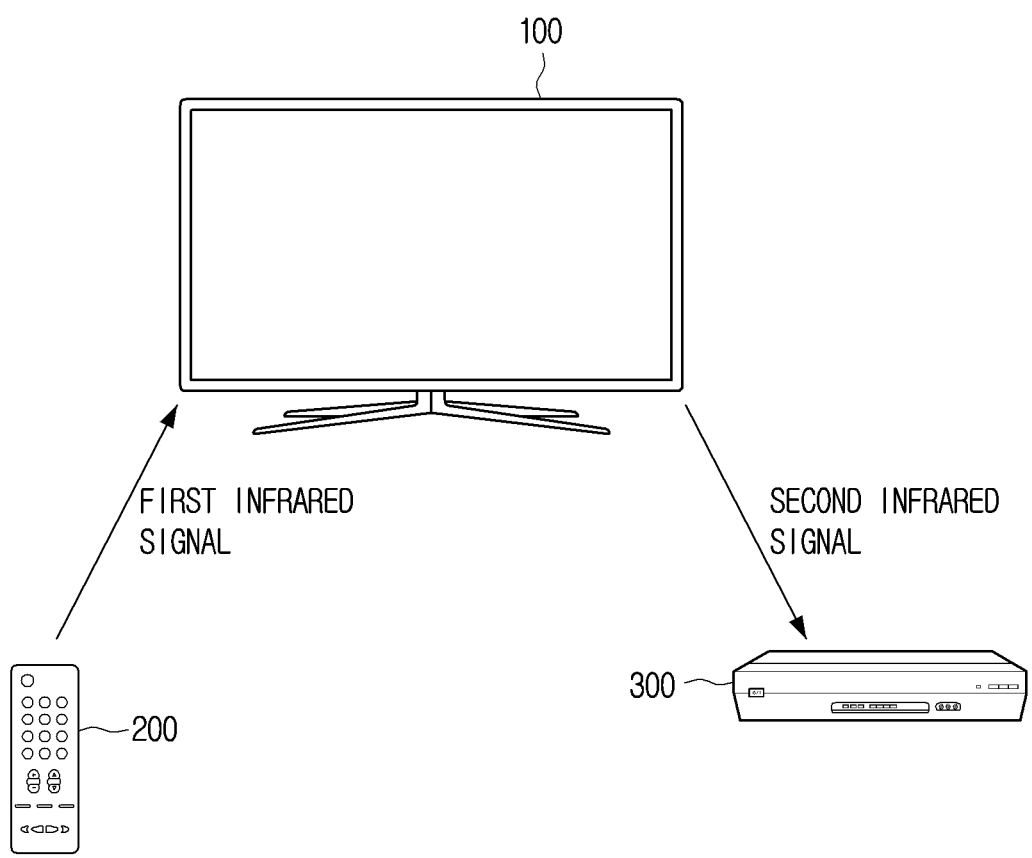
FIG. 1 is a diagram for schematically illustrating a controlling process of an electronic device according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents and/or alternatives of the embodiments of the disclosure. Meanwhile, with respect to the detailed description of the drawings, similar components may be designated by similar reference numerals.

Also, in case it is determined that in describing the embodiments of the disclosure, detailed explanation of related known functions or components may unnecessarily confuse the gist of the disclosure, the detailed explanation will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Meanwhile, the terms used in the disclosure are just used to explain certain embodiments of the disclosure, and are not intended to limit the scope of protection of the disclosure. Also, singular expressions include plural expressions, unless defined obviously differently in the context.

In the disclosure, terms such as "have," "may have," "include" and "may include" should be construed as denoting that there are such characteristics (e.g.: elements such as numerical values, functions, operations and components), and the terms are not intended to exclude the existence of additional characteristics.

Also, in the disclosure, the expressions "A and/or B," "at least one of A and/or B," or "one or more of A and/or B" and the like may include all possible combinations of the listed items. For example, "A or B," "at least one of A and B" or "at least one of A or B" refer to all of the following cases: (1) including at least one A, (2) including at least one B or (3) including at least one A and at least one B.

In addition, the expressions "first," "second" and the like used in the disclosure may be used to describe various elements regardless of any order and/or degree of importance. Also, such expressions are used only to distinguish one element from another element, and are not intended to limit the elements.

Further, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g.: a third element).

In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Further, in the embodiments, 'a module' or 'a part' may perform at least one function or operation, and may be implemented as hardware or software, or as a combination of hardware and software. Further, a plurality of 'modules' or 'parts' may be integrated into at least one module and implemented as at least one processor, excluding 'a module' or 'a part' that needs to be implemented as specific hardware.

Meanwhile, various elements and areas in drawings were illustrated schematically. Accordingly, the technical idea of the disclosure is not limited by the relative sizes or intervals illustrated in the accompanying drawings.

Meanwhile, an electronic device according to the various embodiments of the disclosure may include at least one of, for example, a smartphone, a tablet PC, a desktop PC, a laptop PC, or a wearable device. Also, a wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or an implantable circuit.

In addition, in some embodiments, an electronic device according to various embodiments of the disclosure may include at least one of, for example, a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic photo frame.

Also, in another embodiment of the disclosure, an electronic device may include at least one of various types of medical instruments (e.g., various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g., a navigation device for vessels, a gyrocompass, etc.), avionics, a security device, a head unit for a vehicle, an industrial or a household robot, a drone, an ATM of a financial institution, a point of sales (POS) of a store, or an Internet of things (IoT) device (e.g., a light bulb, various types of sensors, a sprinkler device, a fire alarm, a thermostat, a street light, a toaster, exercise equipment, a hot water tank, a heater, a boiler, etc.).

Hereinafter, embodiments of the disclosure will be described in detail with reference to the accompanying drawings to the extent that those having ordinary skill in the art to which the disclosure belongs can easily carry out the embodiments.

FIG. 1 is a diagram for schematically illustrating a controlling process of an electronic device according to an embodiment of the disclosure.

As illustrated in FIG. 1, an electronic device 100 according to the disclosure may receive an infrared signal from a remote control device 200, and output an infrared signal based on the received infrared signal. For example, the electronic device 100 may be a TV or a monitor, but is not limited thereto.

The remote control device 200 may receive a user input for controlling the electronic device 100 and an external device 300, and output an infrared signal for controlling the electronic device 100 and the external device 300 based on the received user input. In particular, the remote control device 200, according to the disclosure, may receive a user input for controlling the external device 300, and output an infrared signal for controlling the external device 300 based on the received user input. For example, the remote control device 200 may be a remote control, but is not limited thereto, and it may be implemented as a smartphone including an infrared transmission module, etc.

The external device 300 may receive an infrared signal output from the electronic device 100, and control the operation of the external device 300 based on the received infrared signal. For example, the external device 300 may be a set top box, a DVD player, or a console game machine, etc., but the type of the external device 300 is also not limited to a specific type as in the cases of the electronic device 100 and the remote control device 200. Also, the number of the external devices 300 that are the subjects of control by the remote control device 200 is not limited to a specific number, either.

According to an embodiment of the disclosure, the electronic device 100 may receive a first infrared signal from the remote control device 200. Specifically, the electronic device 100 may receive a first infrared signal output from the remote control device 200 according to a user input for controlling the external device 300 connected with the electronic device 100.

To be more specific, based on the remote control device 200 receiving a user input for controlling the external device 300 connected with the electronic device 100, the remote control device 200 may output a first infrared signal for controlling the external device 300 based on the received user input. Then, the electronic device 100 may receive the first infrared signal output from the remote control device 200.

The first infrared signal output from the remote control device 200 may include control information such as the control code of the external device 300, and may have one or more of: a specific length, a specific cycle, or a specific pattern. As described below, the type of the first infrared signal may be identified based on the at least one of the length, the cycle, or the pattern of the first infrared signal.

The length of the first infrared signal may refer to the length of a section where the first infrared signal is received, and the cycle of the first infrared signal may refer to a distance between adjacent first infrared signals in a case the same first infrared signal is repetitively received. Also, the pattern of the first infrared signal may be a characteristic included in the first infrared signal, and it may be, for example, a unique characteristic modulated such that a characteristic according to crossing of a high level and a low level varies according to the type of the first infrared signal.

Based on the first infrared signal being received, the electronic device 100 may identify a second infrared signal corresponding to one of control commands for controlling the operation of the external device 300 based on control information included in the received first infrared signal. Specifically, the electronic device 100 may identify a control command corresponding to the received first infrared signal based on the control code included in the received first infrared signal, and identify a second infrared signal corresponding to the identified control command.

For example, based on the first infrared signal being received, the electronic device 100 may identify a control command of "increase channels" as a control command corresponding to the received first infrared signal based on the control code included in the received first infrared signal, and identify a second infrared signal corresponding to the identified control command.

That is, the electronic device 100 does not output the received first infrared signal as it is, but may identify a second infrared signal corresponding to one of control commands for controlling the operation of the external device 300 based on control information included in the received first infrared signal.

Meanwhile, the electronic device 100 may identify the output timing of the second infrared signal based on the type of the first infrared signal. Then, the electronic device 100 may identify the type of the first infrared signal based on at least one of the length, the cycle, or the pattern of the first infrared signal. Also, at least one of the length, the cycle, or the pattern of the first infrared signal may be identified according to the type of a user input that was input through the remote control device 200. In particular, at least one of the length, the cycle, or the pattern of the first infrared signal may be identified according to whether the length of a user input that was input through the remote control device 200 is longer than or equal to a predetermined time period.

Meanwhile, at least one of the length, the cycle, or the pattern of the first infrared signal may be identified according to the speed of a user input that was input through the remote control device 200, the type of a control command corresponding to the user input, etc. For example, the cycle of the first infrared signal may vary according to a user's speed of pushing one of a plurality of control buttons included in the remote control device 200. Meanwhile, in describing the disclosure below, a case wherein at least one of the length, the cycle, or the pattern of the first infrared signal is identified according to whether the length of a user input that was input through the remote control device 200 is longer than or equal to a predetermined time period will be described in detail.

Meanwhile, in describing the disclosure, the length of a user input refers to the length of a user input of pushing one of a plurality of control buttons included in the remote control device 200. That is, a predetermined time period becomes a standard for distinguishing whether a user input a control command corresponding to a control button once by pushing one of a plurality of control buttons included in the remote control device 200 (i.e., a single key input), or a user continuously input a control command corresponding to a control button (i.e., continuous key inputs). It is obvious that a predetermined time period can vary according to a user's setting.

Specifically, the type of the first infrared signal according to the disclosure may include a first type or a second type. An infrared signal of a first type may refer to an infrared signal which is the received first infrared signal output according to a user input of pushing one of a plurality of control buttons included in the remote control device 200 for a time period shorter than a predetermined time period. Meanwhile, an infrared signal of a second type may refer to an infrared signal of a second type which is the received second infrared signal output according to a user input of pushing one of a plurality of control buttons included in the remote control device 200 for a time period longer than or equal to a predetermined time period.

In other words, based on at least one of the length, the cycle, or the pattern of the received first infrared signal, the electronic device 100 may identify whether the received first infrared signal is an infrared signal of a first type which is the received first infrared signal output according to a user input of pushing one of a plurality of control buttons included in the remote control device 200 for a time period shorter than a predetermined time period, or an infrared signal of a second type output according to a user input of pushing one of a plurality of control buttons included in the remote control device 200 for a time period longer than or equal to a predetermined time period.

Meanwhile, unlike a case where a user input of pushing one of a plurality of control buttons included in the remote control device 200 for a time period shorter than a predetermined time period is received through the remote control device 200, based on a user input of pushing one of a plurality of control buttons included in the remote control device 200 for a time period longer than or equal to a predetermined time period being received through the remote control device 200, the remote control device 200 may repetitively output the first infrared signal. In this case, the electronic device 100 may receive a plurality of first infrared signals repetitively output from the remote control device 200. Then, based on each of the plurality of first infrared signals being received, the electronic device 100 may repetitively output the identified second infrared signal.

Meanwhile, the electronic device 100 may identify the output timing of the second infrared signal based on the aforementioned type of the first infrared signal. Specifically, based on the received first infrared signal being an infrared signal of a first type, the electronic device 100 may identify the output timing of the second infrared signal as a first output timing corresponding to the first type. Also, based on the received first infrared signal being an infrared signal of a second type, the electronic device 100 may identify the output timing of the second infrared signal as a second output timing corresponding to the second type.

To be more specific, based on the received first infrared signal being an infrared signal of a first type output according to a user input of pushing one of a plurality of control buttons included in the remote control device 200 for a time period shorter than a predetermined time period, the electronic device 100 may identify the output timing of the second infrared signal as a first output timing corresponding to the first type.

Also, based on the received first infrared signal being an infrared signal of a second type output according to a user input of pushing one of a plurality of control buttons included in the remote control device 200 for a time period longer than or equal to a predetermined time period, the electronic device 100 may identify the output timing of the second infrared signal as a second output timing corresponding to the second type and different from the first output timing.

Specifically, according to an embodiment of the disclosure, based on the received first infrared signal being an infrared signal of a second type, and the electronic device 100 receiving a plurality of first infrared signals repetitively output from the remote control device 200, the electronic device 100 may identify the output timing of the second infrared signal such that each of the output timings of the plurality of second infrared signals repetitively output does not overlap with each of the receiving timings of the plurality of received first infrared signals.

To be more specific, the electronic device 100 may identify the output timing of the second infrared signal such that each of the output sections of the plurality of second infrared signals has a time interval in a predetermined range with each of the receiving sections of the plurality of first infrared signals. Further, based on the plurality of first infrared signals being received by a predetermined cycle, the electronic device 100 may identify the output timing of the second infrared signal such that the plurality of second infrared signals are output by the same cycle as the predetermined cycle by which the plurality of first infrared signals are received. A more detailed explanation about the output timing of the second infrared signal will be made below with reference to the timing diagrams of FIGS. 4A to 4C.

Based on the second infrared signal and the output timing of the second infrared signal being identified as described above, the electronic device 100 may output the identified second infrared signal based on the output timing of the identified second infrared signal. Then, the external device 300 may receive the second infrared signal output from the electronic device 100, and control the operation of the external device 300 based on the received second infrared signal.

According to the aforementioned embodiment of the disclosure, interference between an infrared signal received from the remote control device 200 and an infrared signal output from the electronic device 100 can be prevented. Also, in accordance thereto, misrecognition of signals and breakage of a control operation at an external device can be prevented.

Figure 2:
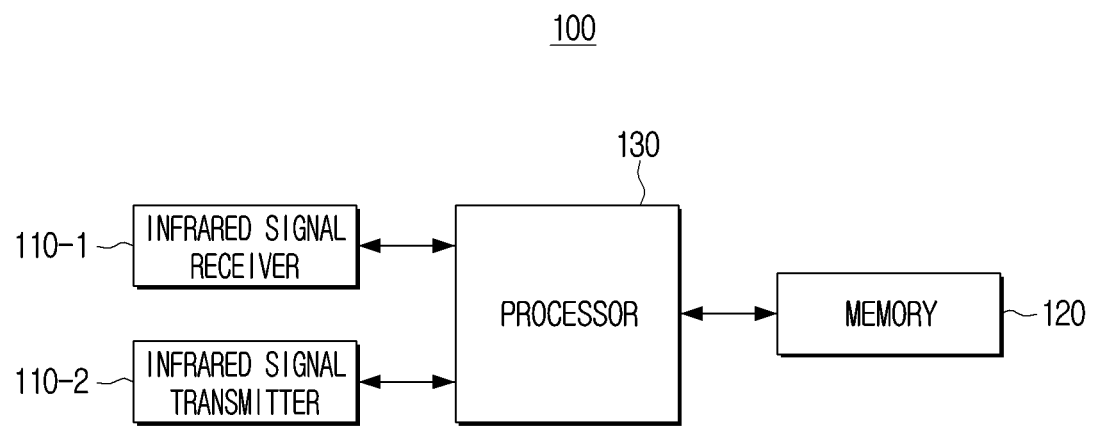
FIG. 2 is a block diagram schematically illustrating a configuration of an electronic device according to an embodiment of the disclosure.

FIG. 2 is a block diagram schematically illustrating a configuration of an electronic device according to an embodiment of the disclosure.

As illustrated in FIG. 2, the electronic device 100 according to an embodiment of the disclosure includes an infrared signal receiver 110-1, an infrared signal transmitter 110-2, a memory 120, and a processor 130.

The infrared signal receiver 110-1 may receive an infrared signal output from the outside of the electronic device 100, and the infrared signal transmitter 110-2 may output an infrared signal to the outside of the electronic device 100.

Specifically, the infrared signal receiver 110-1 may include an infrared phototransistor for receiving infrared rays and a demodulation module for demodulating a modulated infrared signal. Also, the infrared signal transmitter 110-2 may include an infrared rays emitting diode (IRED) for generating an infrared signal and a modulation module for modulating an infrared signal. Meanwhile, in the explanation of the disclosure, description of the infrared signal receiver 110-1 and the infrared signal transmitter 110-2 by specifying them as separate components is not intended to restrict the possibility that the infrared signal receiver 110-1 and the infrared signal transmitter 110-2 can be implemented as one component.

In particular, in the various embodiments according to the disclosure, the infrared signal receiver 110-1 may receive a first infrared signal from the remote control device 200. Specifically, the infrared signal receiver 110-1 may receive a first infrared signal output from the remote control device 200 according to a user input for controlling the external device 300 connected with the electronic device 100.

To be more specific, based on the remote control device 200 receiving a user input for controlling the external device 300 connected with the electronic device 100, the remote control device 200 may output a first infrared signal for controlling the external device 300 based on the received user input. Then, the electronic device 100 may receive the first infrared signal output from the remote control device 200.

Meanwhile, the infrared signal transmitter 110-2 may output a second infrared signal based on the output timing of the second infrared signal. Specifically, the processor 130 may control the infrared signal transmitter 110-2 to output a second infrared signal identified based on the identified output timing.

In the memory 120, computer instruction code, which may include at least one command regarding the electronic device 100, may be stored. Also, in the memory 120, an operating system (O/S) for operating the electronic device 100 may be stored. In addition, in the memory 120, various types of software programs or applications for making the electronic device 100 operate according to the various embodiments of the disclosure may be stored. Further, the memory 120 may include a semiconductor memory, such as, a flash memory or a magnetic storage medium, such as, a hard disk, etc.

Specifically, in the memory 120, various types of software modules for making the electronic device 100 operate according to the various embodiments of the disclosure may be stored, and the processor 130 may control the operation of the electronic device 100 by executing the various types of software modules stored in the memory 120. That is, the memory 120 may be accessed by the processor 130, and one or more of reading/recording/correction/deletion/update, etc. of data by the processor 130 may be performed.

Meanwhile, in the disclosure, the term memory 120 may be used as a meaning including a memory 120, a read only memory (ROM) inside the processor 130, a random access memory (RAM), or a memory card installed on the electronic device 100 (e.g., a micro SD card, a memory stick).

In particular, in the various embodiments according to the disclosure, in the memory 120, information on the output timings of the second infrared signal corresponding to each of types of first infrared signals may be stored. Specifically, in the memory 120, information on the first output timing corresponding to the first infrared signal of the first type and information on the second output timing corresponding to the first infrared signal of the second type, etc. may be stored.

In addition, in the memory 120, information on second infrared signals corresponding to each of a plurality of control commands for controlling the operation of the external device 300, and information for identifying the type of the first infrared signal based on at least one of the length, the cycle, or the pattern of the first infrared signal, etc. may be stored.

Other than the above, various kinds of necessary information may be stored in the memory 120 within a range for achieving the purpose of the disclosure, and information stored in the memory 120 may be updated as it is received from a server or the external device 300 or input by a user.

The processor 130 may control the overall operations of the electronic device 100. Specifically, the processor 130 may be connected with the components of the electronic device 100 including the infrared signal receiver 110-1, the infrared signal transmitter 110-2, and the memory 120 as described above, and may control the overall operations of the electronic device 100 by executing computer instruction code, which may include at least one command, stored in the memory 120 as described above. Also, the memory 130 may perform a process of controlling the electronic device 100 according to the disclosure based on various kinds of information stored in the memory 120.

The processor 130 may be implemented in various ways. For example, the processor 130 may be implemented as at least one of an application specific integrated circuit (ASIC), an embedded processor, a microprocessor, a hardware control logic, a hardware finite state machine (FSM), or a digital signal processor (DSP). Meanwhile, in the disclosure, the term processor 130 may be used as a meaning including one or more of a central processing unit (CPU), a graphic processing unit (GPU), and a main processing unit (MPU), etc.

In particular, in the various embodiments according to the disclosure, the processor 130 may control a process including receipt of a first infrared signal, identification of a second infrared signal, identification of the output timing of the second infrared signal, and outputting of the second infrared signal according to the various embodiments of the disclosure. Hereinafter, a controlling process of the processor 130 according to the disclosure will be described in detail.

According to an embodiment of the disclosure, the processor 130 may receive a first infrared signal output from the remote control device 200 according to a user input for controlling the external device 300 connected with the electronic device 100 through the infrared signal receiver 110-1.

To be more specific, based on the remote control device 200 receiving a user input for controlling the external device 300 connected with the electronic device 100, the remote control device 200 may output a first infrared signal for controlling the external device 300 based on the received user input. Then, the processor 130 may receive the first infrared signal output from the remote control device 200 through the infrared signal receiver 110-1.

The first infrared signal output from the remote control device 200 may include control information such as the control code of the external device 300, and may have one or more of a specific length, a specific cycle, or a specific pattern. Also, as it will be described below, the type of the first infrared signal may be identified based on at least one of the length, the cycle, or the pattern of the first infrared signal.

Here, the length of the first infrared signal may refer to the length of a section wherein the first infrared signal is received, and the cycle of the first infrared signal may refer to a distance between adjacent first infrared signals in case the same first infrared signal is repetitively received. Also, the pattern of the first infrared signal may be a characteristic included in the first infrared signal, and it may be, for example, a unique characteristic modulated such that a characteristic according to crossing of a high level and a low level varies according to the type of the first infrared signal.

Based on the first infrared signal being received, the processor 130 may identify a second infrared signal corresponding to one of control commands for controlling the operation of the external device 300 based on control information included in the received first infrared signal. Specifically, the processor 130 may identify a control command corresponding to the received first infrared signal based on the control code included in the received first infrared signal, and identify a second infrared signal corresponding to the identified control command.

For example, based on the first infrared signal being received, the processor 130 may identify a control command "increase channels" as a control command corresponding to the received first infrared signal based on the control code included in the received first infrared signal, and identify a second infrared signal corresponding to the identified control command.

That is, the processor 130 does not control the infrared signal transmitter 110-2 to output the received first infrared signal as it is, but may identify a second infrared signal corresponding to one of control commands for controlling the operation of the external device 300 based on control information included in the received first infrared signal and control the infrared signal transmitter 110-2 to output the second infrared signal.

Meanwhile, the processor 130 may identify the output timing of the second infrared signal based on the type of the first infrared signal. Then, the processor 130 may identify the type of the first infrared signal based on at least one of the length, the cycle, or the pattern of the first infrared signal. Also, at least one of the length, the cycle, or the pattern of the first infrared signal may be identified according to the type of a user input that was input through the remote control device 200. In particular, at least one of the length, the cycle, or the pattern of the first infrared signal may be identified according to whether the length of a user input that was input through the remote control device 200 is longer than or equal to a predetermined time period.

Meanwhile, at least one of the length, the cycle, or the pattern of the first infrared signal may be identified according to the speed of a user input that was input through the remote control device 200, the type of a control command corresponding to the user input, etc. For example, the cycle of the first infrared signal may vary according to a user's speed of pushing one of a plurality of control buttons included in the remote control device 200. Meanwhile, in describing the disclosure below, a case where at least one of the length, the cycle, or the pattern of the first infrared signal is identified according to whether the length of a user input that was input through the remote control device 200 is longer than or equal to a predetermined time period will be described in detail.

Meanwhile, in describing the disclosure, the length of a user input may refer to the length of a user input of pushing one of a plurality of control buttons included in the remote control device 200. That is, a predetermined time period may become a standard for distinguishing whether a user input a control command corresponding to a control button once by pushing one of a plurality of control buttons included in the remote control device 200 (i.e., a single key input), or a user continuously input a control command corresponding to a control button (i.e., continuous key inputs). It is obvious that a predetermined time period can vary according to a user's setting.

Specifically, the type of the first infrared signal according to the disclosure may include a first type and a second type. An infrared signal of a first type may refer to an infrared signal which is the received first infrared signal output according to a user input of pushing one of a plurality of control buttons included in the remote control device 200 for a time period shorter than a predetermined time period. Meanwhile, an infrared signal of a second type may refer to an infrared signal of a second type which is the received second infrared signal output according to a user input of pushing one of a plurality of control buttons included in the remote control device 200 for a time period longer than or equal to a predetermined time period.

In other words, based on at least one of the length, the cycle, or the pattern of the received first infrared signal, the processor 130 may identify whether the received first infrared signal is an infrared signal of a first type which is the received first infrared signal output according to a user input of pushing one of a plurality of control buttons included in the remote control device 200 for a time period shorter than a predetermined time period, or an infrared signal of a second type output according to a user input of pushing one of a plurality of control buttons included in the remote control device 200 for a time period longer than or equal to a predetermined time period.

Meanwhile, unlike a case where a user input of pushing one of a plurality of control buttons included in the remote control device 200 for a time period shorter than a predetermined time period is received through the remote control device 200, based on a user input of pushing one of a plurality of control buttons included in the remote control device 200 for a time period longer than or equal to a predetermined time period being received through the remote control device 200, the remote control device 200 may repetitively output the first infrared signal. In this case, the processor 130 may receive a plurality of first infrared signals repetitively output from the remote control device 200 through the infrared signal receiver 110-1. Then, based on each of the plurality of first infrared signals being received, the processor 130 may repetitively output the identified second infrared signal through the infrared signal transmitter 110-2.

Meanwhile, the processor 130 may identify the output timing of the second infrared signal based on the aforementioned type of the first infrared signal. Specifically, based on the received first infrared signal being an infrared signal of a first type, the processor 130 may identify the output timing of the second infrared signal as a first output timing corresponding to the first type. Also, based on the received first infrared signal being an infrared signal of a second type, the processor 130 may identify the output timing of the second infrared signal as a second output timing corresponding to the second type.

To be more specific, based on the received first infrared signal being an infrared signal of a first type output according to a user input of pushing one of a plurality of control buttons included in the remote control device 200 for a time period shorter than a predetermined time period, the processor 130 may identify the output timing of the second infrared signal as a first output timing corresponding to the first type.

Also, based on the received first infrared signal being an infrared signal of a second type output according to a user input of pushing one of a plurality of control buttons included in the remote control device 200 for a time period longer than or equal to a predetermined time period, the processor 130 may identify the output timing of the second infrared signal as a second output timing corresponding to the second type and different from the first output timing.

Specifically, according to an embodiment of the disclosure, based on the received first infrared signal being an infrared signal of a second type, and the processor 130 receiving a plurality of first infrared signals repetitively output from the remote control device 200 through the infrared signal receiver 110-1, the processor 130 may identify the output timing of the second infrared signal such that each of the output timings of the plurality of second infrared signals repetitively output does not overlap with each of the receiving timings of the plurality of received first infrared signals.

To be more specific, the processor 130 may identify the output timing of the second infrared signal such that each of the output sections of the plurality of second infrared signals has a time interval in a predetermined range with each of the receiving sections of the plurality of first infrared signals. Further, based on the plurality of first infrared signals being received by a predetermined cycle, the processor 130 may identify the output timing of the second infrared signal such that the plurality of second infrared signals are output by the same cycle as the predetermined cycle by which the plurality of first infrared signals are received.

As described above, the output timings of the plurality of second infrared signals may be identified by the relation with the receiving timings of the plurality of received first infrared signals. Information on the receiving timings of the plurality of first infrared signals may be stored in the memory 120 in advance, or it may be received from an external device or a server through a communication interface as will be described below.

More detailed explanation about the output timing of the second infrared signal will be made below with reference to the timing diagrams of FIGS. 4A to 4C.

Based on the second infrared signal and the output timing of the second infrared signal being identified as described above, the processor 130 may control the infrared signal transmitter 110-2 to output the second infrared signal identified based on the output timing of the identified second infrared signal. Then, the external device 300 may receive the second infrared signal output from the infrared signal transmitter, and control the operation of the external device 300 based on the received second infrared signal.

According to the aforementioned embodiment of the disclosure, interference between an infrared signal received from the remote control device 200 and an infrared signal output from the electronic device 100 can be prevented. Also, in accordance thereto, misrecognition of signals and breakage of a control operation at an external device can be prevented.

Figure 3:
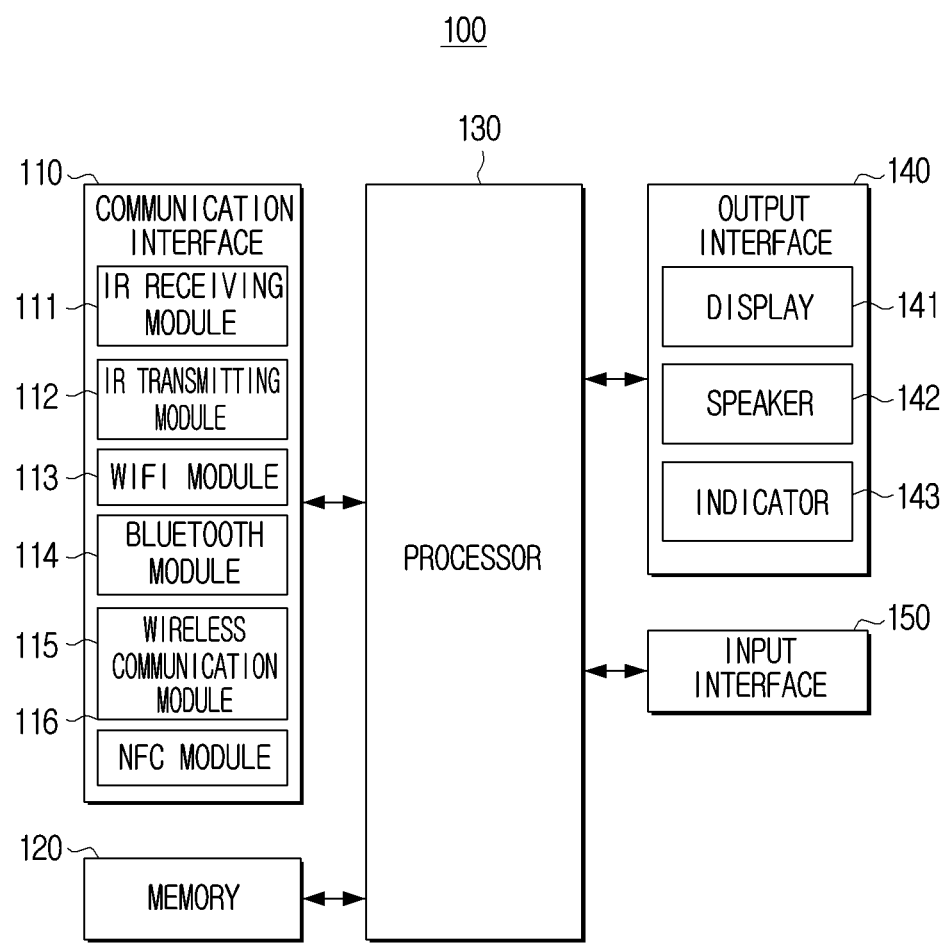
FIG. 3 is a block diagram illustrating in detail a configuration of an electronic device according to an embodiment of the disclosure.

FIG. 3 is a block diagram illustrating in detail a configuration of an electronic device according to an embodiment of the disclosure.

As illustrated in FIG. 3, the electronic device 100 according to an embodiment of the disclosure may not only include an infrared signal receiver 110-1, an infrared signal transmitter 110-2, a memory 120, and a processor 130, but may also further include an input interface 150 and an output interface. Also, the electronic device 100 according to an embodiment of the disclosure may be implemented as a communication interface 110 that not only includes the infrared signal receiver 110-1 and the infrared signal transmitter 110-2, but also various kinds of communication modules. However, components as above are merely exemplary ones, and it is obvious that in implementing the disclosure, new components can be added in addition to the components as above, or some components can be omitted. In addition, the various modules of the communication interface 110 may correspond to various interfaces, respectively.

The communication interface 110 may include hardware circuitry, and may perform communication with a server or the external device 300. Specifically, the processor 130 may receive various kinds of data or information from a server or the external device 300 connected through the communication interface 110, and may transmit various kinds of data or information to the server (not shown) or the external device 300.

Also, the communication interface 110 may not only include an IR receiving module 111 and an IR transmitting module 112 that were respectively referred to as the infrared signal receiver 110-1 and the infrared signal transmitter 110-2 in the description regarding FIG. 2, but may also include at least one of a WiFi module, a Bluetooth module, a wireless communication module, or an NFC module.

Specifically, the IR receiving module 111 may receive an infrared signal output from the outside of the electronic device 100, and may include an infrared phototransistor for receiving infrared rays and an infrared receiving module for demodulating a modulated infrared signal. Also, the IR transmitting module 112 may output an infrared signal to the outside of the electronic device 100, and may include an infrared rays emitting diode (IRED) for generating an infrared signal.

Meanwhile, each of the WiFi module 113 and the Bluetooth module 114 may perform communication by a WiFi method and a Bluetooth method, respectively. In the case of using the WiFi module 113 or the Bluetooth module 114, various kinds of connection information such as a Service Set Identifier (SSID) may be transmitted and received first, and communication may be connected by using the connection information, and then various kinds of information may be transmitted and received.

Meanwhile, the wireless communication module 115 may perform communication according to various communication standards, such as, one or more of: Institute of Electrical and Electronics Engineers (IEEE), Zigbee, 3rd Generation (3G), 3rd Generation Partnership Project (3GPP), Long Term Evolution (LTE), and 5th Generation (5G). Also, the NFC module 116 may perform communication by a near field communication (NFC) method using a 13.56 MHz band among various RF-ID frequency bands such as 135 kHz, 13.56 MHz, 433 MHz, 860-960 MHz, and 2.45 GHz.

In particular, in the various embodiments according to the disclosure, the processor 130 may perform communication with the external device 300 by a WiFi method or a Bluetooth method through each of the WiFi module 113 or the Bluetooth module 114, respectively, and receive information on a control command of the external device 300.

Also, the processor 130 may perform communication with the remote control device 200 by a WiFi method or a Bluetooth method through each of the WiFi module 113 or the Bluetooth module 114, respectively, and receive information on the output timings of the second infrared signal corresponding to each of the types of the first infrared signal or information for identifying the type of the first infrared signal based on at least one of the length, the cycle, or the pattern of the first infrared signal.

The output interface may include hardware circuitry, and the processor 130 may output various functions that the electronic device 100 can perform through the output interface. Also, the output interface may include at least one of a display 141, a speaker 142, or an indicator 143.

The display 141 may output image data by control of the processor 130. Specifically, the display 141 may output an image stored in the memory 120 in advance by control of the processor 130. In particular, the display 141 according to an embodiment of the disclosure may display a user interface stored in the memory 120.

The display 141 may be implemented as a liquid crystal display (LCD) panel, organic light emitting diodes (OLEDs), etc. Also, the display 141 may be implemented as a flexible display, a transparent display, etc. depending on cases. However, the display 141 according to an embodiment of the disclosure is not limited to a specific type.

The speaker 142 may output audio data by control of the processor 130, and the indicator 143 may be turned on by control of the processor 130.

In particular, in the various embodiments according to the disclosure, the display 141 may include a waveguide. The waveguide may play the role of making a second infrared signal output while being induced to a specific direction.

Also, the processor 130 may blast a second infrared signal to the front surface of the electronic device 100 through the waveguide included in the display 141. Blasting of a second infrared signal through a waveguide will be described in more detail with reference to FIGS. 5A and 5B.

Meanwhile, the processor 130 may control the display 141 to display information on an external device 300 which becomes the subject of control among a plurality of external devices 300 connected with the electronic device 100. Specifically, the processor 130 may provide a user interface including a list of the plurality of external devices 300 connected with the electronic device 100.

Then, based on a user command for selecting an external device 300 which becomes the subject of control among a plurality of external devices 300 being input through the input interface 150, the processor 130 may control the display 141 to display information received from the selected external device 300 or information on the selected external device 300, etc. Based on information received from the selected external device 300 or information on the selected external device 300, etc. being displayed, the user may input a user command for controlling the selected external device 300 through the remote control device 200.

Meanwhile, the type of the first infrared signal may be identified based on at least one of the length, the cycle, or the pattern of the first infrared signal received through the infrared receiver, and information on the type of a user input corresponding to the identified first infrared signal may be output through at least one of the display 141, the speaker 142, or the indicator 143.

The input interface 150 may include hardware circuitry, and the processor 130 may receive a user command for controlling the operation of the electronic device 100 through the input interface 150. Specifically, the input interface 150 may consist of components such as a microphone, a camera (not shown), and a remote control signal receiver (not shown), etc. Also, the input interface 150 may be implemented in the form of being included in the display 141 as a touch screen.

In particular, in the various embodiments according to the disclosure, the processor 130 may receive a user command for selecting an external device 300 which becomes the subject of control among a plurality of external devices 300 through the input interface 150. In particular, in case the input interface 150 is implemented in the form of being included in the display 141 as a touch screen, the processor 130 may receive a user command for selecting an external device 300 which becomes the subject of control among a plurality of external devices 300 based on a user's touch interaction of selecting an item for an external device 300 in the list of a plurality of external devices 300 provided through a user interface displayed on the display 141.

Figure 4A:
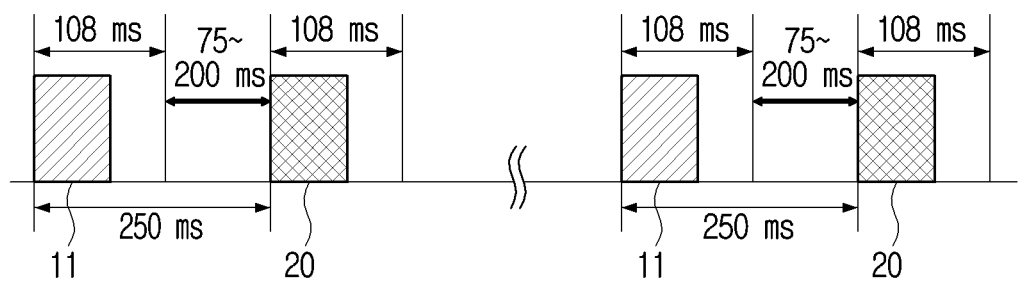
FIG. 4A is a timing diagram for illustrating in detail a process of identifying the output timing of a second infrared signal.
Figure 4B:
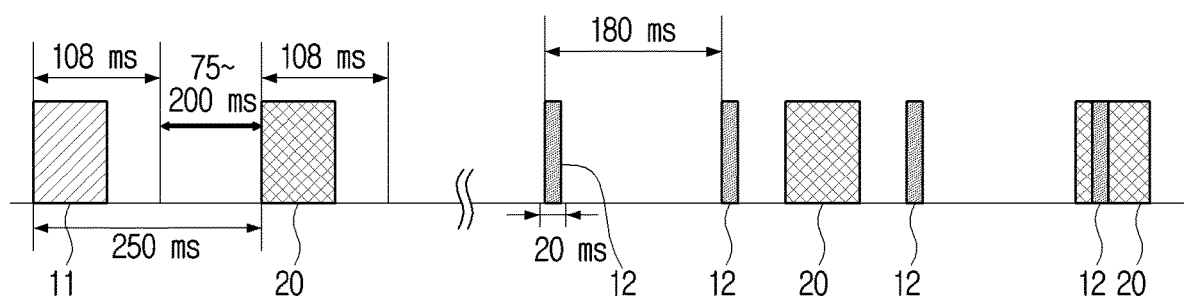
FIG. 4B is a timing diagram for illustrating in detail a process of identifying the output timing of a second infrared signal.
Figure 4C:
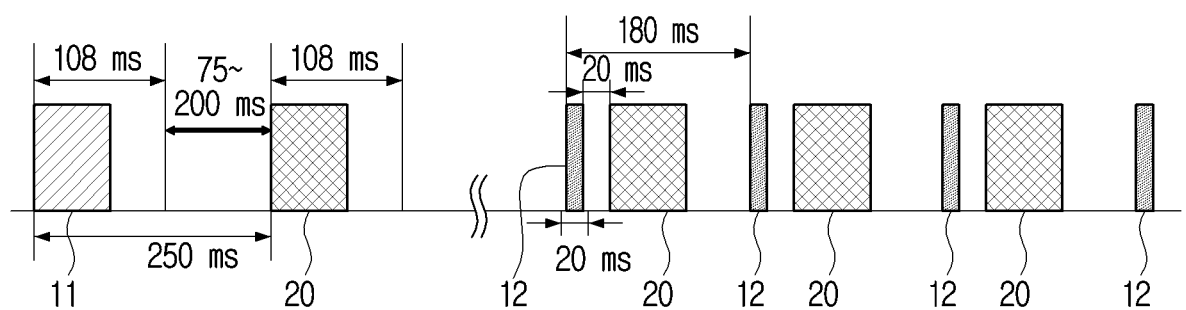
FIG. 4C is a timing diagram for illustrating in detail a process of identifying the output timing of a second infrared signal.

FIGS. 4A to 4C are timing diagrams for illustrating in detail a process of identifying the output timing of a second infrared signal.

In FIGS. 4A to 4C, the signal and the cycle of the first infrared signal, the signal and the cycle of the second infrared signal, and the time interval between the receiving section of the first infrared signal and the output section of the second infrared signal, etc. were specified as specific numerical values, but this is just for clearly explaining a process of identifying the output timing of the second infrared signal according to the disclosure, and the disclosure is obviously not limited to a specific numerical range.

Meanwhile, in FIGS. 4A to 4C, the first infrared signal 11 of the first type, the first infrared signal 12 of the second type, and the second infrared signal 20 were illustrated while the same reference numeral was designated to each of them. Also, in FIGS. 4A to 4C, the receiving section of the first infrared signal and the receiving section of the second infrared signal were illustrated in simplified forms while the modulated form of each signal was not illustrated in detail.

FIG. 4A is with respect to a conventional technology, and is a diagram illustrating the receiving timing of the first infrared signal of the first type and the first output timing of the second infrared signal.

As described above, based on the received first infrared signal being the infrared signal 11 of the first type, the electronic device 100 may identify the output timing of the second infrared signal 20 as a first output timing corresponding to the first type.

Specifically, based on the received first infrared signal being the infrared signal 11 of the first type output according to a user input of pushing one of a plurality of control buttons included in the remote control device 200 for a time period shorter than a predetermined time period, the electronic device 100 may identify the output timing of the second infrared signal 20 as a first output timing corresponding to the first type. Then, the electronic device 100 may output the second infrared signal 20 based on the identified first output timing.

For example, as illustrated in FIG. 4A, based on the received first infrared signal being the infrared signal 11 of the first type, the electronic device 100 may output the second infrared signal 20 while identifying the output timing of the signal to have a time interval of from 75 milliseconds (ms) to 200 milliseconds with the receiving section of the first infrared signal.

Meanwhile, the section of 108 milliseconds as illustrated in FIG. 4A includes a blank space of a specific length. Here, the blank space may refer to a blank space included in the process of modulating the first infrared signal before the signal is output from the remote control device 200 and a blank space included in the process of modulating the second infrared signal before the signal is output. Accordingly, in describing the disclosure with reference to FIGS. 4A to 4C, the space of 108 milliseconds including a blank space will be referred to as the receiving section of the first infrared signal and the output section of the second infrared signal.

FIG. 4B is with respect to a conventional technology, and is a diagram for illustrating that, in case the received first infrared signal is the infrared signal 12 of the second type, if the second infrared signal 20 is output based on the first output timing as in the case where the received first infrared signal is the infrared signal 11 of the first type, the receiving timing of the first infrared signal and the output timing of the second infrared signal 20 may overlap.

Specifically, unlike the case of FIG. 4A, based on the received first infrared signal being the infrared signal 12 of the second type, the electronic device 100 may receive a plurality of first infrared signals repetitively output from the remote control device 200, based on the second infrared signal 20 being output based on the first output timing as in the case where the received first infrared signal is the infrared signal 11 of the first type, at least one of the output timings of the plurality of second infrared signals and at least one of the receiving timings of the plurality of received first infrared signals may overlap.

Specifically, FIG. 4B is a timing diagram for illustrating the receiving section of a first infrared signal received by the electronic device 100 and the output section of a second infrared signal that the electronic device 100 output based on the first output timing in accordance thereto, in a case a user input of pushing one of a plurality of control buttons for a time period longer than or equal to a predetermined time period was received through the remote control device 200 and a first infrared signal was output from the remote control device 200.

Meanwhile, based on a user input of pushing one of a plurality of control buttons for a time period longer than or equal to a predetermined time period being received through the remote control device 200, before a time period longer than or equal to a predetermined time period passes after the user input was received, the first infrared signal 11 of the first type may be output from the remote control device 200 as in the case where a user input of pushing one of a plurality of control buttons for a time period shorter than a predetermined time period was received through the remote control device 200. Then, based on a predetermined time period passing afterwards, the first infrared signal 12 of the second type may be output from the remote control device 200.

Accordingly, as illustrated in FIG. 4B, based on a user input of pushing one of a plurality of control buttons for a time period longer than or equal to a predetermined time period being received through the remote control device 200, the electronic device 100 may receive the first infrared signal 11 of the first type, and output the second infrared signal 20 based on the first output timing. Afterwards, based on the first infrared signal 12 of the second type being received, the electronic device 100 may output the second infrared signal 20 based on the first output timing.

Also, as illustrated in FIG. 4B, based on the electronic device 100 receiving the first infrared signal 11 of the first type and outputting the second infrared signal 20 based on the first output timing, and still outputting the second infrared signal 20 based on the first output timing even though the first infrared signal 12 of the second type is received afterwards, at least one of the output timings of the plurality of second infrared signals and at least one of the receiving timings of the plurality of first infrared signals may overlap.

That is, based on a user input of pushing one of a plurality of control buttons for a time period longer than or equal to a predetermined time period being received through the remote control device 200, there is a possibility that at least one of the output timings of the plurality of second infrared signals repetitively output and at least one of the receiving timings of the plurality of first infrared signals repetitively received may overlap.

For example, based on the time interval from the time when the first infrared signal 11 of the first type was received from the remote control device 200 to the time when the first infrared signal 12 of the second type was received not coinciding with the receiving cycle of the first infrared signal 12 of the second type, at least one of the output timings of the plurality of second infrared signals repetitively output and at least one of the receiving timings of the plurality of first infrared signals repetitively received may overlap.

As another example, based on the length of the first infrared signal 12 of the second type being 20 milliseconds, the length of the second infrared signal 20 being 108 milliseconds, the receiving cycle of the first infrared signal 12 of the second type being 180 milliseconds, the output section of the second infrared signal 20 having a time interval of 150 milliseconds from the receiving section of the first infrared signal 12 of the second type, the first infrared signal 12 of the second type received in the second order and the second infrared signal 20 output in accordance thereto may overlap. Further, in this case, if the receiving cycle of the first infrared signal 12 of the second type and the output cycle of the second infrared signal 20 are the same, all of the plurality of first infrared signals received from the first infrared signal 12 of the second type received in the second order may overlap with the second infrared signal 20 output in accordance thereto.

FIG. 4C is with respect to an embodiment of the disclosure, and is a diagram for illustrating that, in a case that the received first infrared signal is the infrared signal 12 of the second type, based on the second infrared signal 20 being output based on the second output timing different from the case where the received first infrared signal is the infrared signal 11 of the first type, the receiving timing of the first infrared signal and the output timing of the second infrared signal 20 do not overlap.

As described above, according to an embodiment of the disclosure, based on the received first infrared signal being an infrared signal of the second type, the electronic device 100 may identify the output timing of the second infrared signal as the second output timing corresponding to the second type.

That is, based on the received first infrared signal being the first infrared signal 12 of the second type output according to a user input of pushing one of a plurality of control buttons included in the remote control device 200 for a time period longer than or equal to a predetermined time period, the electronic device 100 may identify the output timing of the second infrared signal 20 as the second output timing corresponding to the second type and different from the first output timing.

Specifically, based on the received first infrared signal being the infrared signal 12 of the second type, and the electronic device 100 receiving a plurality of first infrared signals repetitively output from the remote control device 200, the electronic device 100 may identify the output timing of the second infrared signal 20 such that each of the output timings of the plurality of second infrared signals repetitively output does not overlap with each of the receiving timings of the plurality of received first infrared signals.

To be more specific, the electronic device 100 may identify the output timing of the second infrared signal 20 such that each of the output sections of the plurality of second infrared signals has a time interval in a predetermined range with each of the receiving sections of the plurality of first infrared signals. Further, based on the plurality of first infrared signals being received by a predetermined cycle, the electronic device 100 may identify the output timing of the second infrared signal 20 such that the plurality of second infrared signals are output by the same cycle as the predetermined cycle by which the plurality of first infrared signals are received.

For example, as illustrated in FIG. 4C, in a case that the length of the first infrared signal 12 of the second type is 20 milliseconds, and the length of the second infrared signal 20 is 108 milliseconds, and the receiving cycle of the first infrared signal 12 of the second type is 180 milliseconds, based on the output section of the second infrared signal 20 having a time interval of from 15 milliseconds to 37 milliseconds from the receiving section of the first infrared signal, and more preferably, a time interval of 20 milliseconds, the first infrared signal 12 of the second type received in the second order and the second infrared signal 20 output in accordance thereto do not overlap.

Further, in this case, based on the receiving cycle of the first infrared signal 12 of the second type and the output cycle of the second infrared signal 20 being the same, in other words, based on the time interval between the receiving section of the first infrared signal 12 of the second type received after the second order and the output section of the second infrared signal 20 output in accordance thereto being also 20 milliseconds, all of the plurality of first infrared signals received after the second order do not overlap with the second infrared signal output in accordance thereto.

Figure 5A:
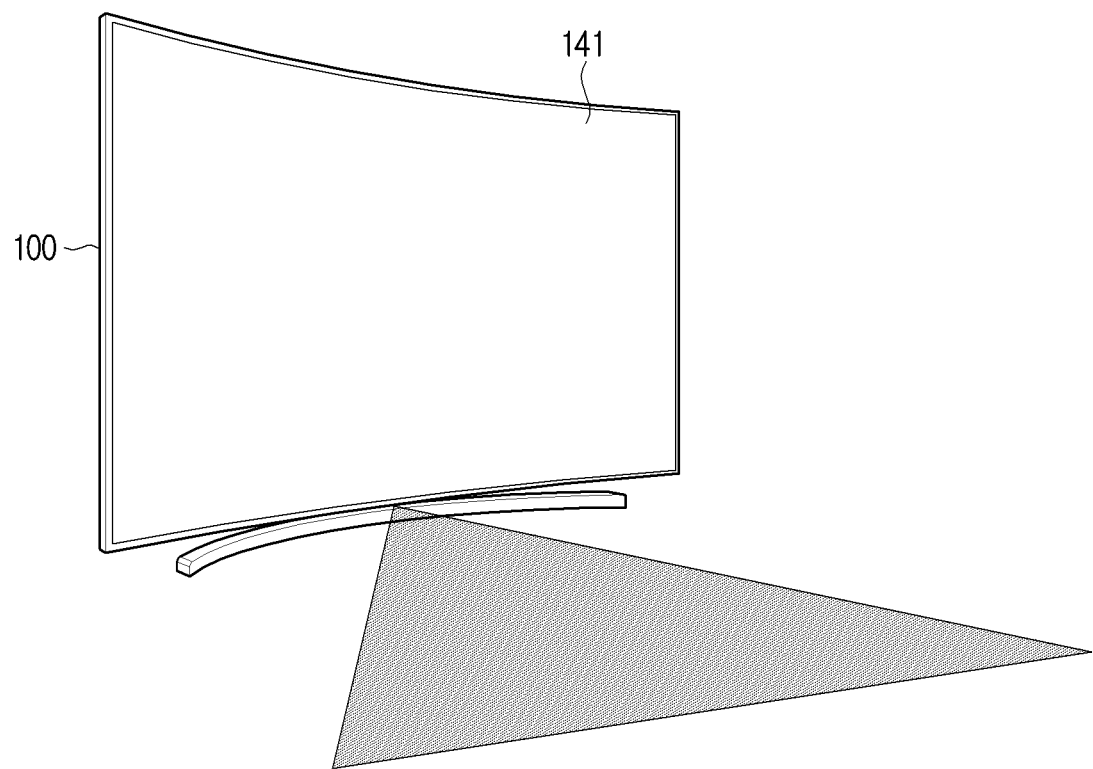
FIG. 5A is a diagram for illustrating in detail an example wherein an electronic device according to an embodiment of the disclosure blasts a second infrared signal through a waveguide included in a display.
Figure 5B:
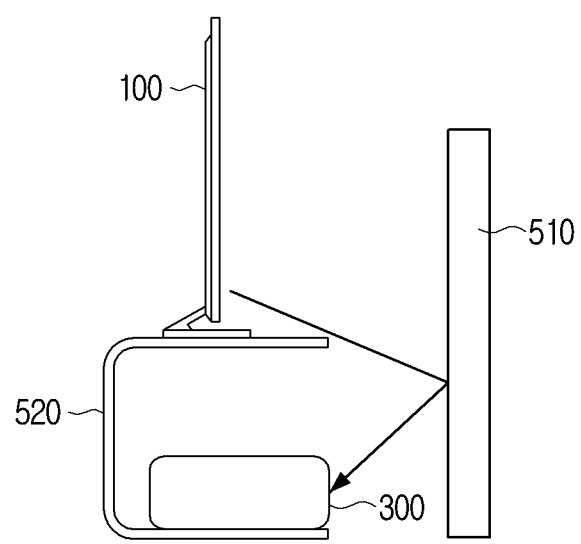
FIG. 5B is a diagram for illustrating in detail an example wherein an electronic device according to an embodiment of the disclosure blasts a second infrared signal through a waveguide included in a display.

FIGS. 5A to 5B are diagrams for illustrating in detail an example where an electronic device according to an embodiment of the disclosure blasts a second infrared signal through a waveguide included in a display.

As illustrated in FIG. 5A, the electronic device 100 according to an embodiment of the disclosure may include a display 141. Also, the display 141 may include a waveguide. Here, the waveguide may play the role of making a second infrared signal output while being induced to a specific direction.

According to an embodiment of the disclosure, the electronic device 100 may blast a second infrared signal to the front surface of the electronic device 100 through the waveguide included in the display 141.

Also, based on a second infrared signal being blasted to the front surface of the electronic device 100 through the waveguide, the external device 300 may receive the second infrared signal blasted from the electronic device 100. Meanwhile, as illustrated in FIG. 5B, the external device 300 may be not located on the front surface of the electronic device 100, but may be arranged together on the furniture 520 for installing the electronic device 100 and the external device 300 and located in the lower part or the side surface, etc. of the electronic device 100. In this case, the external device 300 may receive a second infrared signal blasted from the electronic device 100 and then reflected on an object such as the wall 510 located on the front side of the electronic device 100 or the furniture, etc.

Meanwhile, based on the external device 300 receiving the second infrared signal blasted from the electronic device 100, the external device 300 may control the operation of the external device 300 based on the received second infrared signal.

Figure 6A:
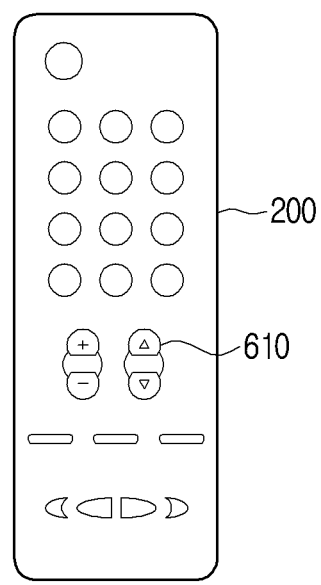
FIG. 6A is a diagram for illustrating in detail a case wherein a remote control device according to an embodiment of the disclosure is implemented as a smartphone including a remote control or an infrared transmission module.
Figure 6B:
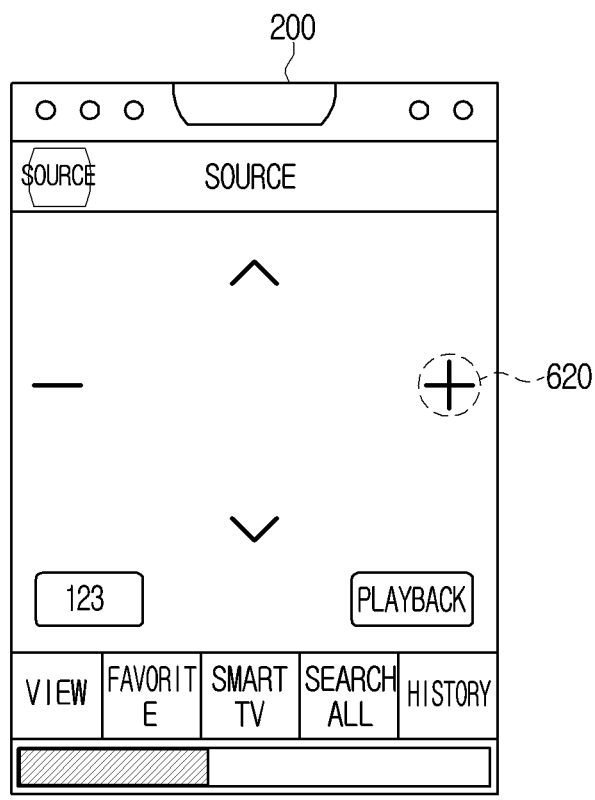
FIG. 6B is a diagram for illustrating in detail a case wherein a remote control device according to an embodiment of the disclosure is implemented as a smartphone including a remote control or an infrared transmission module.
Figure 6C:
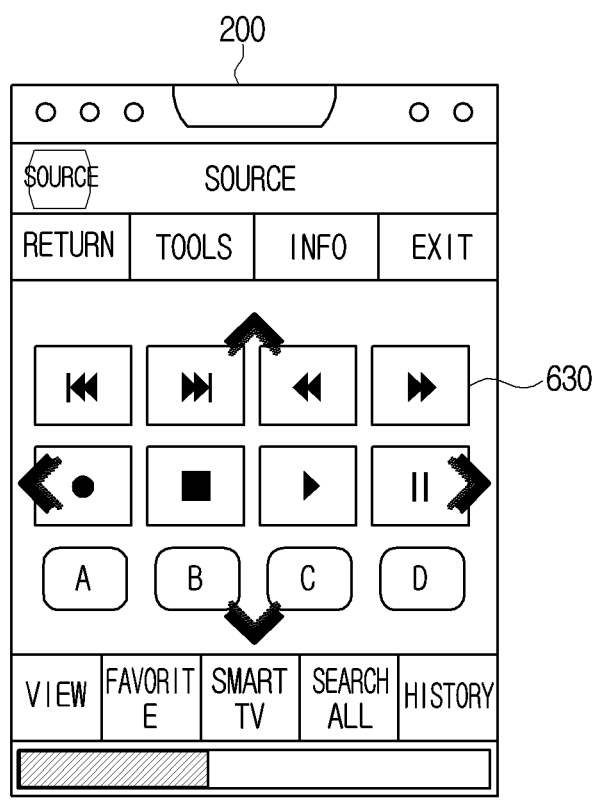
FIG. 6C is a diagram for illustrating in detail a case wherein a remote control device according to an embodiment of the disclosure is implemented as a smartphone including a remote control or an infrared transmission module.

FIGS. 6A to 6C are diagrams for illustrating in detail an example where a remote control device according to an embodiment of the disclosure is implemented as a smartphone including a remote control or an infrared transmission module.

As described above, the remote control device 200 according to an embodiment of the disclosure may receive a user input for controlling the external device 300, and output an infrared signal for controlling the external device 300 based on the received user input.

Also, as illustrated in FIG. 6A, the remote control device 200 according to an embodiment of the disclosure may be implemented as a remote control. In addition, the remote control device 200 may include a plurality of control buttons for controlling the electronic device 100 and the external device 300. For example, as illustrated in FIG. 6A, the remote control device 200 may include a plurality of control buttons such as "increase volume," "decrease volume," "increase channels," and "decrease channels."

In general, control buttons corresponding to control commands such as "increase channels," "decrease channels," "increase volume," and "decrease volume" may correspond to control buttons that a user pushes for a time period longer than or equal to a predetermined time period, but the disclosure is not limited to the aforementioned example.

Meanwhile, as in a case where a user pushes a control button corresponding to both of control commands "turn on the power" and "turn off the power" for a time period longer than or equal to a predetermined time period, based on consecutively performing the operations of the electronic device 100 or the external device 300 corresponding to a control button not suiting the intention of a user input, in general, even if a user pushes a control button for a time period longer than or equal to a predetermined time period, the remote control device 200 may not repetitively output an infrared signal of the second type.

Meanwhile, a plurality of control buttons included in the remote control device 200 may be provided on the surface of the remote control device 200. Also, in a case that the plurality of control buttons included in the remote control device 200 are provided on the surface of the remote control device 200, the remote control device 200 may receive a user input for controlling the external device 300 based on a user interaction of pushing a control button provided on the surface of the remote control device 200.

For example, as illustrated in FIG. 6A, the remote control device 200 may receive a user input corresponding to "increase channels" among control commands for controlling the operation of the external device 300 based on a user interaction of pushing the "increase channels" button 610 provided on the surface of the remote control device 200, and output a first infrared signal based on the received user input.

Meanwhile, so far, a case where the plurality of control buttons included in the remote control device 200 according to the disclosure are physical buttons was described, but according to another embodiment of the disclosure, the plurality of control buttons included in the remote control device 200 may be implemented as soft buttons.

Specifically, as illustrated in FIGS. 6B and 6C, the remote control device 200 according to an embodiment of the disclosure may be implemented as a smartphone including an infrared receiving module. Also, the plurality of control buttons included in the remote control device 200 may be provided in the form of soft buttons through a user interface displayed on the display of the remote control device 200.

In a case that the plurality of control buttons included in the remote control device 200 are provided in the form of soft buttons, the remote control device 200 may receive a user input for controlling the electronic device 100 and the external device 300 based on a user interaction of pushing a soft button on the user interface, i.e., touching an object on the user interface.

For example, the remote control device 200 may receive a user input corresponding to "increase volume" among control commands for controlling the operations of the electronic device 100 and the external device 300 based on a user interaction of touching the "increase volume" button 620 as illustrated in FIG. 6B, and may output a first infrared signal according to the received user input.

Also, the remote control device 200 may receive a user input corresponding to "fast rewind" among control commands for controlling the operations of the electronic device 100 and the external device 300 based on a user interaction of touching the "fast rewind" button 630 as illustrated in FIG. 6C, and may output a first infrared signal according to the received user input.

FIG. 7 is a flow chart illustrating a controlling method of an electronic device according to an embodiment of the disclosure.

According to an embodiment of the disclosure, the electronic device 100 may receive a first infrared signal output from the remote control device 200 according to a user input for controlling the external device 300 connected with the electronic device 100 at operation S710.

To be more specific, based on the remote control device 200 receiving a user input for controlling the external device 300 connected with the electronic device 100, the remote control device 200 may output a first infrared signal for controlling the external device 300 based on the received user input. Then, the electronic device 100 may receive the first infrared signal output from the remote control device 200.

Based on the first infrared signal being received, the electronic device 100 may identify a second infrared signal corresponding to one of control commands for controlling the operation of the external device 300 based on control information included in the received first infrared signal at operation S720.

Specifically, the electronic device 100 may identify a control command corresponding to the received first infrared signal based on the control code included in the received first infrared signal, and identify a second infrared signal corresponding to the identified control command.

The electronic device 100 may identify the output timing of the second infrared signal based on the type of the first infrared signal at operation S730.

Meanwhile, the electronic device 100 may identify the output timing of the second infrared signal based on the type of the first infrared signal. Then, the electronic device 100 may identify the type of the first infrared signal based on at least one of the length, the cycle, or the pattern of the first infrared signal. Also, at least one of the length, the cycle, or the pattern of the first infrared signal may be identified according to the type of the user input that was input through the remote control device 200.

Specifically, the type of the first infrared signal according to the disclosure may include a first type or a second type. An infrared signal of a first type may refer to an infrared signal which is the received first infrared signal output according to a user input of pushing one of a plurality of control buttons included in the remote control device 200 for a time period shorter than a predetermined time period. Meanwhile, an infrared signal of a second type may refer to an infrared signal of a second type which is the received second infrared signal output according to a user input of pushing one of a plurality of control buttons included in the remote control device 200 for a time period longer than or equal to a predetermined time period.

Meanwhile, the electronic device 100 may identify the output timing of the second infrared signal based on the aforementioned type of the first infrared signal. Specifically, based on the received first infrared signal being an infrared signal of a first type, the electronic device 100 may identify the output timing of the second infrared signal as a first output timing corresponding to the first type. Also, based on the received first infrared signal being an infrared signal of a second type, the electronic device 100 may identify the output timing of the second infrared signal as a second output timing corresponding to the second type.

To be more specific, if the received first infrared signal is an infrared signal of a first type output according to a user input of pushing one of a plurality of control buttons included in the remote control device 200 for a time period shorter than a predetermined time period, the electronic device 100 may identify the output timing of the second infrared signal as a first output timing corresponding to the first type.

Also, based on the received first infrared signal being an infrared signal of a second type output according to a user input of pushing one of a plurality of control buttons included in the remote control device 200 for a time period longer than or equal to a predetermined time period, the electronic device 100 may identify the output timing of the second infrared signal as a second output timing corresponding to the second type and different from the first output timing.

Specifically, according to an embodiment of the disclosure, based on the received first infrared signal being an infrared signal of a second type, and the electronic device 100 receiving a plurality of first infrared signals repetitively output from the remote control device 200, the electronic device 100 may identify the output timing of the second infrared signal such that each of the output timings of the plurality of second infrared signals repetitively output does not overlap with each of the receiving timings of the plurality of received first infrared signals.

To be more specific, the electronic device 100 may identify the output timing of the second infrared signal such that each of the output sections of the plurality of second infrared signals has a time interval in a predetermined range with each of the receiving sections of the plurality of first infrared signals. Further, based on the plurality of first infrared signals being received by a predetermined cycle, the electronic device 100 may identify the output timing of the second infrared signal such that the plurality of second infrared signals are output by the same cycle as the predetermined cycle by which the plurality of first infrared signals are received.

Based on the second infrared signal and the output timing of the second infrared signal being identified, the electronic device 100 may output the second infrared signal identified based on the output timing of the second infrared signal identified at operation S740.

Then, the external device 300 may receive the second infrared signal output from the electronic device 100, and control the operation of the external device 300 based on the received second infrared signal.

Meanwhile, the method of controlling the electronic device 100 according to the aforementioned embodiment may be implemented as a program and provided to the electronic device 100. In particular, a program including the method of controlling the electronic device 100 may be provided while being stored in a non-transitory computer readable medium.

Specifically, in a non-transitory computer readable recording medium including a program executing a method of controlling the electronic device 100, the method of controlling the electronic device 100 may include the steps of, based on receiving a first infrared signal output from the remote control device 200 according to a user input for controlling the external device 300 connected with the electronic device 100, identifying a second infrared signal corresponding to one of control commands for controlling the operation of the external device 300 based on control information included in the received first infrared signal, identifying the output timing of the second infrared signal based on the type of the first infrared signal, and outputting the second infrared signal based on the identified output timing.

Here, a non-transitory computer readable medium refers to a medium that stores data semi-permanently, and is readable by machines, but not a medium that is a transitory media, such as, a carrier wave or a signal medium. Specifically, the aforementioned various applications or programs may be provided while being stored in a non-transitory computer readable medium such as a compact disc (CD), a digital versatile disc (DVD), a hard disk, a blue-ray disk, a Universal Serial Bus (USB), a memory card, a ROM and the like.

According to the aforementioned various embodiments of the disclosure, interference between an infrared signal received from a remote control device and an infrared signal output from an electronic device can be prevented. Also, in accordance thereto, misrecognition of signals and breakage of a control operation at an external device can be prevented.

Each of the components according to the aforementioned various embodiments of the disclosure as above (e.g., a module or a program) may consist of a singular object or a plurality of objects. Also, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner.

Operations performed by a module, a program, or other components according to the various embodiments may be executed sequentially, in parallel, repetitively, or heuristically. Or, at least some of the operations may be executed in a different order, or omitted, or other operations may be added.

Meanwhile, the term "a part" or "a module" used in the disclosure includes a unit consisting of hardware, software, or firmware, and it may be interchangeably used with terms, for example, logic, a logical block, a component, or a circuit. Also, "a part" or "a module" may be a component consisting of an integrated body or a minimum unit performing one or more functions or a portion thereof. For example, a module may consist of an application-specific integrated circuit (ASIC).

Also, the various embodiments of the disclosure may be implemented as software including instructions that can be stored in machine-readable storage media, which can be read by machines (e.g., computers). The machines refer to apparatuses that call instructions stored in a storage medium, and can operate according to the called instructions, and the apparatuses may include the electronic device (e.g., the electronic device 100) according to the embodiments described in the disclosure.

In case an instruction as described above is executed by a processor, the processor may perform a function corresponding to the instruction by itself, or by using other components under its control. An instruction may include a code that is generated or executed by a compiler or an interpreter.

A storage medium that is readable by computers may be provided in the form of a non-transitory storage medium. Here, the term 'non-transitory' only means that a storage medium does not include transitory signals, and is tangible, but does not indicate whether data is stored in the storage medium semi-permanently or temporarily.

According to an embodiment of the disclosure, the method according to the various embodiments described above may be provided while being included in a computer program product. A computer program product refers to a product, and it can be traded between a seller and a buyer.

A computer program product can be distributed on-line in the form of a storage medium that is readable by machines (e.g., a compact disc read only memory (CD-ROM)), or through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

While preferred embodiments of the disclosure have been shown and described so far, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
an infrared signal receiver;
an infrared signal transmitter;
a memory that stores computer instruction code; and
a processor that executes the computer instruction code, which causes the processor to:
receive a first infrared signal output from a remote control device according to a user input for controlling an external device connected with the electronic device through the infrared signal receiver,
identify a second infrared signal corresponding to one of control commands for controlling an operation of the external device based on control information included in the received first infrared signal,
identify an output timing of the second infrared signal for outputting the second infrared signal at different time from the first infrared signal based on a type of the first infrared signal, and
control the infrared signal transmitter to output the identified second infrared signal based on the identified output timing.

2. The electronic device of claim 1, wherein the processor is further configured to execute the computer instruction code to:
identify the type of the first infrared signal based on at least one of a length, a cycle, or a pattern of the first infrared signal.

3. The electronic device of claim 2, wherein the processor is further configured to execute the computer instruction code to:
based on the received first infrared signal being an infrared signal of a first type output according to a user input of pushing one of a plurality of control buttons included in the remote control device for a time period shorter than a predetermined time period, identify the output timing of the second infrared signal as a first output timing corresponding to the first type, and
based on the received first infrared signal being an infrared signal of a second type output according to a user input of pushing one of the plurality of control buttons included in the remote control device for a time period longer than or equal to the predetermined time period, identify the output timing of the second infrared signal as a second output timing corresponding to the second type and different from the first output timing.

4. The electronic device of claim 3, wherein the processor is further configured to execute the computer instruction code to:
receive a plurality of first infrared signals repetitively output according to the user input of pushing one of the plurality of control buttons included in the remote control device for the time period longer than or equal to the predetermined time period from the remote control device through the infrared signal receiver, and based on receiving each of the plurality of first infrared signals, control the infrared signal transmitter to repetitively output the identified second infrared signal.

5. The electronic device of claim 4, wherein the processor is further configured to execute the computer instruction code to:
identify the output timing of the second infrared signal such that each output timing of the plurality of second infrared signals repetitively output does not overlap with each receiving timing of the plurality of received first infrared signals.

6. The electronic device of claim 5, wherein the processor is further configured to execute the computer instruction code to:
identify the output timing of the second infrared signal such that each output section of the plurality of second infrared signals has a time interval in a predetermined range with each receiving section of the plurality of first infrared signals.

7. The electronic device of claim 6, wherein the processor is further configured to execute the computer instruction code to:
based on receiving the plurality of first infrared signals by a predetermined cycle through the infrared signal receiver, identify the output timing of the second infrared signal such that the plurality of second infrared signals are output through the infrared signal transmitter by a same cycle as the predetermined cycle by which the plurality of first infrared signals are received.

8. The electronic device of claim 6, wherein the time interval in the predetermined range is from 15 milliseconds (ms) to 37 milliseconds.

9. The electronic device of claim 1, further comprising: a display, wherein the processor is further configured to execute the computer instruction code to:
blast the second infrared signal to a front surface of the electronic device through a waveguide included in the display.

10. A method of controlling an electronic device, the method comprising:
receiving a first infrared signal output from a remote control device according to a user input for controlling an external device connected with the electronic device;
identifying a second infrared signal corresponding to one of control commands for controlling an operation of the external device based on control information included in the received first infrared signal;
identifying an output timing of the second infrared signal for outputting the second infrared signal at different time from the first infrared signal based on a type of the first infrared signal; and
outputting the identified second infrared signal based on the identified output timing.

11. The method of claim 10, wherein the identifying the output timing of the second infrared signal further comprises:
identifying the type of the first infrared signal based on at least one of a length, a cycle, or a pattern of the first infrared signal.

12. The method of claim 11, wherein the identifying the output timing of the second infrared signal further comprises:
based on the received first infrared signal being an infrared signal of a first type output according to a user input of pushing one of a plurality of control buttons included in the remote control device for a time period shorter than a predetermined time period, identifying the output timing of the second infrared signal as a first output timing corresponding to the first type; and
based on the received first infrared signal being an infrared signal of a second type output according to a user input of pushing one of the plurality of control buttons included in the remote control device for a time period longer than or equal to the predetermined time period, identifying the output timing of the second infrared signal as a second output timing corresponding to the second type and different from the first output timing.

13. The method of claim 12, wherein
the receiving a first infrared signal further comprises: receiving a plurality of first infrared signals repetitively output according to the user input of pushing one of the plurality of control buttons included in the remote control device for the time period longer than or equal to the predetermined time period from the remote control device; and
the outputting the second infrared signal further comprises: based on receiving each of the plurality of first infrared signals, repetitively outputting the identified second infrared signal.

14. The method of claim 13, wherein the identifying the output timing of the second infrared signal comprises: identifying the output timing of the second infrared signal such that each output timing of the plurality of second infrared signals repetitively output does not overlap with each receiving timing of the plurality of received first infrared signals.

15. The method of claim 14, wherein the identifying the output timing of the second infrared signal comprises: identifying the output timing of the second infrared signal such that each output section of the plurality of second infrared signals has a time interval in a predetermined range with each receiving section of the plurality of first infrared signals.

16. The method of claim 15, wherein the identifying the output timing of the second infrared signal comprises: based on receiving the plurality of first infrared signals by a predetermined cycle, identifying the output timing of the second infrared signal such that the plurality of second infrared signals are output by the same cycle as the predetermined cycle by which the plurality of first infrared signals are received.

17. The method of claim 15, wherein the time interval in the predetermined range is from 15 milliseconds (ms) to 37 milliseconds.

18. The method of claim 10, wherein the outputting the second infrared signal comprises: blasting the second infrared signal to a front surface of the electronic device through a waveguide included in a display of the electronic device.

19. A non-transitory computer readable recording medium including a program executing a method of controlling an electronic device, wherein the method of controlling the electronic device comprises:
based on receiving a first infrared signal output from a remote control device according to a user input for controlling an external device connected with the electronic device, identifying a second infrared signal corresponding to one of control commands for controlling an operation of the external device based on control information included in the received first infrared signal;

identifying an output timing of the second infrared signal for outputting the second infrared signal at different time from the first infrared signal based on a type of the first infrared signal; and outputting the second infrared signal based on the identified output timing.

* * * * *